United States Patent [19]

Nagasawa et al.

[11] 4,075,830

[45] Feb. 28, 1978

[54] SOLID ADHESIVE COMPOSITIONS

[75] Inventors: Shigeru Nagasawa, Ageo; Toshinao Okitsu, Tokyo, both of Japan

[73] Assignee: Konishi Co., Ltd., Osaka, Japan

[21] Appl. No.: 680,393

[22] Filed: Apr. 26, 1976

[51] Int. Cl.$^2$ ............................................. C08L 91/00
[52] U.S. Cl. ................................. 260/18 N; 106/170; 106/211; 260/29.6 MN; 260/23 AR; 260/23 R
[58] Field of Search ...... 260/18 N, 29.6 MN, 23 AR, 260/23 R, 23 AL; 106/211, 170

[56] References Cited

U.S. PATENT DOCUMENTS

| | | | |
|---|---|---|---|
| 3,159,606 | 12/1964 | Sims et al. | 260/18 N X |
| 3,576,776 | 4/1971 | Muszik et al. | 260/18 R X |
| 3,663,459 | 5/1972 | Yoshida et al. | 252/546 |
| 3,964,832 | 6/1976 | Cohen et al. | 260/23 R |

*Primary Examiner*—Sandra M. Person
*Attorney, Agent, or Firm*—Sughrue, Rothwell, Mion, Zinn and Macpeak

[57] ABSTRACT

An adhesive composition which is in a wax-like or jelly-like state at room temperature comprising:
  (a) a water soluble or water dispersible polymer having adhesive properties;
  (b) an N-fatty acid acylated amino acid or a salt thereof; and
  (c) water or a mixture of water and one or more organic solvent(s) and/or plasticizer(s).

21 Claims, No Drawings

SOLID ADHESIVE COMPOSITIONS

BACKGROUND OF THE INVENTION

1. Field of the Invention

The present invention relates to an adhesive composition which is in a wax-like or jelly-like state at room temperature.

2. Description of the Prior Art

An adhesive of the type that is inserted in a container in the solid state, pushed out of the container for use, spread over adherend surfaces, and then the remainder re-inserted in the container for subsequent use is generally known as a solid adhesive.

In such a solid adhesive, it is required to blend a gelling agent in a binary composition system comprising an adhesive component and a solvent, and as such gelling agents there are alkali metal salts or ammonium salts of fatty acids as described in U.S. Pat. No. 3,576,776 and benzalsorbitols as described in Japanese Patent Application (OPI) 29,434/72. However, the use of the fatty acid salts or fatty acid soaps described in the aforesaid U.S. Pat. as a gelling agent is accompanied by problems, e.g., the adhesive composition produced usually shows high alkalinity (about 10 pH), which creates a safety problem when it is handled by school children, etc., as well as it takes a long time to produce the adhesive composition and the viscosity of the adhesive composition is high (e.g., higher than 150,000 cps), which makes it difficult to fill the adhesive composition in containers.

When the benzalsorbitols disclosed in the aforesaid Japanese Patent Application are used as the gelling agent, it is necessary to use a comparatively large amount of a low boiling point organic solvent such as an alcohol as the solvent for the produciton of the adhesive since the benzalsorbitols are insoluble or sparingly soluble in water, and, hence, the adhesive composition obtained has the essential fault that the solvent volatilizes during storage or use of the adhesive composition even at room temperature, as well as the fact that the vapor of the solvent volatilized is harmful to humans.

SUMMARY OF THE INVENTION

One object of this invention is, therefore, to provide a solid adhesive composition being free of the above described defects of the prior art and having excellent coatability, shape stability, and adhesive properties.

The inventors have discovered that the object of this invention can be attained by blending:
(a) a water soluble or water dispersible polymer having adhesive properties;
(b) an N-fatty acid acylated amino acid or a salt thereof; and
(c) water or a mixture of water and one or more organic solvent(s) and/or plasticizer(s), i.e., the present invention provides an adhesive composition comprising the aforementioned components (a), (b), and (c).

DETAILED DESCRIPTION OF THE INVENTION

The N-fatty acid acylated amino acid used in this invention as a gelling agent in an N-alkanoylamino acid or an N-alkenoylamino acid, the amino group of the amino acid of which has been acylated by the carboxyl group of the fatty acid, or further a mixture of these acylated amino acids, and, as the fatty acid, saturated or unsaturated fatty acids having 7 to 23 carbon atoms can be used individually or as a combination thereof. The amino acid moiety of the N-fatty acid acylated amino acid preferably has 2 to 10 carbon atoms.

Typical examples of the fatty acid used in this invention are enanthic acid, coconut oil fatty acid, lauric acid, myristic acid, palmitic acid, stearic acid, behenic acid, and oleic acid. Among these fatty acids, saturated fatty acids are particularly preferred in this invention.

Examples of the amino acid bonded to the aforementioned fatty acid are, for example, neutral amino acids such as glycine, N-methylglycine, alanine, such as α-alanine, β-alanine, N-methylalanine, valine, leucine, isoleucine, serine, threonine, etc., and acid amino acids such as glutamic acid, aspartic acid, hydroxyglutamic acid, etc. In particular, while aliphatic amino acids such as the aforesaid acid amino acids are preferably used, aromatic amino acids, e.g., phenylalanine, tyrosine, o-, m-, or p-aminobenzoic acid, etc., may also be used in this invention. Furthermore, the amino acid bonded to the fatty acid may form a salt by neutralizing one or more free acid groups of the amino acid with one or more alkalis, for example, an alkali metal such as sodium, potassium, lithium, etc., an alkanolamine such as triethanolamine, etc., an alkylamine such as ethylamine, etc., and ammonium. Among these salts, monoalkali metal salts are preferred.

Examples of such neutralized fatty acid acylated amino acids are mono-sodium and di-sodium N-stearoylglutamates. Most preferred examples of the N-fatty acid acylated amino acids used in this invention are those consisting of a saturated fatty acid moiety having 14 to 18 carbon atoms, e.g., myristic acid, palmitic acid, stearic acid, etc., and an amino acid moiety, i.e., aminodicarboxylic acid, e.g., aspartic acid, glutamic acid, etc., such as N-myristoylaspartic acid, N-palmitoylaspartic acid, N-stearoylaspartic acid, N-myristoylglutamic acid, N-palmitoylglutamic acid, N-stearoylglutamic acid, and the alkali metal salts of these acids.

Of the gelling agents used in this invention, free N-fatty acid acylated amino acids are most preferred, and mono alkali metal salts thereof such as the mono-sodium, mono-potassium, or mono-lithium salt are preferred, although dialkali metal salts or mono- or di-alkali salts such as diammonium salts, di-amine salts, etc., can also be used.

The gelling agents used in this invention have the following features.

(1) Since the gelling agent shows a remarkable gelling function using a solvent composition mainly comprising water, the adhesive composition prepared by blending the gelling agent can be easily and smoothly applied to papers, etc., simply by lightly rubbing the papers with the adhesive composition to provide a homogeneous coating of the adhesive composition, and, further, the shaped adhesive compositions such as sticks, etc., are not deformed when adherend surfaces are rubbed strongly with these adhesives. In particular, the gelling power is excellent in the range of the neutral state to the acid state, particularly, in the range of pH about 2 to 7, preferably about 2 to about 5.

(2) Since the gelling agent itself does not possess a stimulative activity or allergenic activity on skin, etc., the adhesive composition prepared by blending the gelling agent can be handled safely.

(3) Since the use of organic solvents such as alcohols, etc., is not essential in the case of blending the gelling agent, adhesives which give less solvent odor, less reduction in coating properties and adhesive properties, and less harmful influence on humans due to the volatilization of the organic solvent are obtained.

(4) The transparency of the adhesive compositions obtained using the gelling agents of this invention is superior to those prepared using conventional alkali salts of fatty acids as gelling agent.

The proportion of the N-fatty acid acylated amino acid(s) and/or the salt(s) thereof used as the gelling agent(s) in the adhesive composition of this invention is about 2 to about 30% by weight, preferably about 4 to 20% by weight, of the total amount of the adhesive composition.

The aforesaid N-fatty acid acylated amino acids can be obtained by reacting fatty acids or derivatives thereof with amino acids as described in, for example, Journal of American Oil Chemists' Society, 49, 143 (1972) and ibid., 49, 157 (1972) or may further be prepared by the method described in U.S. Pat. No. 3,663,459.

In this invention, a water soluble or water dispersible polymer having adhesive properties is used as the adhesive component. Various known natural, semi-synthetic, or synthetic polymers may be used as such polymers. Polymers having a mean molecular weight of about 5,000 to about 2,000,000, preferably 10,000 to 1,500,000 are generally used in this invention.

As the water soluble or water dispersible polymer having adhesive properties those polymers having a carboxyl group or carboxylic anhydride group are most effective for achieving good interaction with the gelling agent used in this invention. Of these, those polymers having a higher acidity than that of the gelling agent are preferred. However, polymers being free of carboxyl groups and/or carboxylic anhydride groups can also be used.

Typical examples of the synthetic polymer are copolymers or homopolymers having a carboxyl group or a carboxylic anhydride group, where the proportions of the carboxyl and/or carboxylic anhydride group containing monomer is preferably about 10 to 100 mol%, more preferably about 30 to 100 mol%, based on the total mols of monomer(s) used (e.g., a copolymer of vinyl methyl ether and maleic anhydride, a copolymer of isobutylene and maleic anhydride, polyacrylic acid, polymethacrylic acid, a copolymer of styrene and acrylic acid, a copolymer of ethylene and acrylic acid, etc.), a copolymer of vinyl pyrrolidone and vinyl acetate, polyvinyl acetate, polyvinyl methyl ether, polyvinyl pyrrolidone, polyvinyl alcohol, etc. Examples of the semi-synthetic polymers used in this invention are cellulose derivatives such as methyl cellulose, ethyl cellulose, carboxymethyl cellulose, hydroxymethyl cellulose, etc., and starch derivatives such as carboxymethyl starch, etc. Examples of natural polymers used in this invention are starch, dextrin, etc. These polymers are required to have adhesive properties and to be water soluble or water dispersible.

Particularly preferred examples of the polymers used for the purpose are polymers having a carboxyl group or carboxylic anhydride group, such as a copolymer of vinyl methyl ether and maleic anhydride, in particular, having a mean molecular weight of 50,000 to 1,300,000, polyacrylic acid, in particular, having a mean molecular weight of 10,000 to 300,000, a copolymer of isobutylene and maleic anhydride, in particular, having a mean molecular weight of 10,000 to 300,000, etc. Also, when the polymer used is alkaline or neutral, a mineral acid such as hydrochloric acid, etc., or an organic acid may be, if desired, used in an amount of 0 to about 40% by weight in the adhesive composition. Preferred examples of the organic acid are hydroxycarboxylic acids such as citric acid, lactic acid, tartaric acid, etc. Furthermore, in this invention, the aforementioned adhesive polymer may be used together with a tacky resin such as rosin, a phenol resin, an alkyd resin, etc., for increasing the tackiness of the adhesive composition.

The proportion of the aforesaid adhesive component or polymer blended in the adhesive composition of this invention is generally about 5 to about 50% by weight, preferably about 15 to 35% by weight, of the total amount of the adhesive composition.

In the present invention, water or a mixture of water and one or more organic solvent(s) and/or plasticizer(s) is used as the solvent. When water only is used as the solvent, sufficient effects can be obtained in this invention, but to further improve transparency, coating capability, etc., of the adhesive compositions of this invention, an organic solvent or a plasticizer may be used together with water. (Examples of the organic solvent used in this invention thus include ones which can be used as a plasticizer as well as a solvent.) As the organic solvent hydrophilic solvents are preferred. In this case, it is preferred that the amount of the organic solvent or the plasticizer used together with water be up to but not more than the amount of the water (by weight). Examples of these organic solvents and plasticizers are monohydric alcohols such as ethanol, isobutanol, etc., ethylene glycol, glycerol, hexylene glycol, mono-, di-, or tri-ethylene glycol mono-butyl ether, mono-, di-, or tri-ethylene glycol di-butyl ether, mono-, di-, or tri-ethylene glycol mono-methyl ether, mono-, di-, or tri-ethylene glycol di-methyl ether, mono-, di-, or tri-ethylene glycol mono-ethyl ether, mono-, di-, or tri-ethylene glycol di-ethyl ether, mono-, di-, or tri-ethylene glycol mono-phenyl ether, mono-, di-, or tri-ethylene glycol di-phenyl ether, mono-, di-, or tri-ethylene glycol mono-butyl ether acetate, propylene glycol monomethyl ether, the acetyl trialkyl citrates shown by the following general formula:

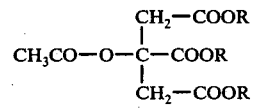

(wherein R is an alkyl group having 1 to 8 carbon atoms), glycerol triacetate, a condensation product of adipic acid and ethylene glycol (molar ratio 1:1), and cyclohexanone. Preferred examples of the organic solvents employed in this invention are mono- or di-ethylene glycol monobutyl ether, mono-, di- or triethylene glycol mono-phenyl ether, and mono- or di-ethylene glycol mono-butyl ether acetate.

Of the above described compounds, ethanol, isobutanol, cyclohexanone, etc., are used only as a solvent, whereas acetyl trialkyl citrates, glycerol triacetate, the condensation product of adipic acid, ethylene glycol, etc., are employed only as a plasticizer. The remaining compounds may be used both as a solvent and as a plasticizer.

The proportion of the organic solvent or plasticizer used in this invention is up to about 40% by weight of the adhesive composition since the proportion of the total solvents used in the adhesive composition of this invention is about 30 to about 80% by weight, preferably about 40 to about 70%, of the total adhesive composition, but the proportion is required to be less than the amount of water used together therewith.

The solid adhesive component of this invention may further contain dyes, pigments, perfumes, perfumed oils, etc., in an amount of about 0.01 to about 10% by weight based on the adhesive composition, to improve the appearance and odor thereof in addition to the aforesaid components (a), (b), and (c).

The solid adhesive composition of this invention can be prepared in a known manner. For example, the aforementioned components are heated in a vessel equipped with a stirrer to 70° to 90° C to dissolve the solid components and the mixture thus obtained may be gelled by cooling in another suitable vessel. Since the viscosity of the aforesaid mixture in the hot state is low, the mixture can be easily poured in a vessel.

The solid adhesive composition of this invention thus prepared has a pH value of about 2 to about 7, preferably about 2 to about 5, which can be easily handled, is excellent in shape stability at use, can be applied easily and uniformly onto adherend materials such as papers, etc., and has good adhesion. Thus, the adhesives of this invention are useful as adhesives in general offices, schools, homes, engineering, and in industry, in general.

The invention will now further be illustrated in more detail by the following examples.

EXAMPLE 1

Into a two liter flask equipped with a stirrer, a reflux condenser, and a thermometer were charged 599 g of water, 70 g of diethylene glycol mono-butyl ehter, 250 g of a vinyl methyl ether/maleic anhydride copolymer (1:1 mol ratio; a mean molecular weight of 250,000), 80 g of N-stearoyl-L-aspartic acid, and 1 g of a lilac perfume, and, after heating the mixture to about 80° C, the mixture was stirred for about 2 hours at the same temperature to dissolve the components. The pH of the mixture obtained was confirmed to be 3.0 using a pH test paper. The mixed liquid was poured into a stainless steel split mold of 15 mm diameter and 30 mm length while hot and then allowed to cool in a refrigerator at −5° C, whereby the mixture gelled. The stick shaped adhesive thus formed was removed from the mold and placed in a lip stick type container. When the adhesive stick thus formed was applied to a kraft paper, the adhesive was smoothly spread thereover without cobwebbing and without destroying the shaped adhesive. When kraft papers were bonded each other using the adhesive thus prepared, the assembly of the papers was pressed by a finger, and then the kraft papers were separated each other after one minute, the papers were torn, which showed that excellent adhesion was obtained.

EXAMPLE 2

Following the same procedure as in Example 1, 150 g of N-lauroylmethyl glycin as the gelling agent was mixed with 300 g of a vinyl methyl ether/maleic anhydride copolymer (1:1 mol ratio; mean molecular weight of 750,000) and 550 g of water. The pH of the mixture was 2.0.

The mixture was charged in an automatic filling machine while hot and then filled in a lip stick type container. The mixture was then gelled by natural cooling to room temperature and the stick shaped adhesive was formed.

The viscosity of the mixture was comparatively low in the high temperature state, and, thus, it could be easily poured into the container.

EXAMPLE 3

Following the same procedure as in Example 1, 100 g of N-lauroyl-N-methyl glycin as the gelling agent was mixed with 150 g of polyacrylic acid (mean molecular weight of 80,000), 50 g of a terpene phenol resin, 550 g of water, and 150 g of diethylene glycol monophenyl ehter. The pH of the mixture was 1.8.

By shaping the mixture as in Example 2, a lip stick shaped adhesive was formed.

EXAMPLE 4

Following the same procedure as in Example 1, 70 g of sodium N-coconut oil fatty acid acylated-N-methyl-β-alaninate as the gelling agent was mixed with 250 g of an isobutylene/maleic anhydride copolymer (1:1 mol ratio; mean molecular weight of 90,000), 50 g of a linseed oil-modified alkyd resin, 500 g of water, and 50 g of diethylene glycol monophenyl ether and 80 g of 28% $NH_4OH$. The pH of the mixture was 3.2.

By shaping the mixture as in Example 2, a lip stick shaped adhesive was obtained.

EXAMPLE 5

Following the same procedure as in Example 1, 150 g of N-myristoyl-N-methyl-β-alanine as the gelling agent was mixed with 200 g of polyvinyl pyrrolidone (mean molecular weight of 900,000) and 650 g of water. The pH of the mixture was 4.6. By shaping the mixture as in Example 2, a lip stick shaped adhesive was obtained.

EXAMPLE 6

Following the procedure of Example 1, 70 g of monosodium N-stearoyl-L-aspartate as the gelling agent was mixed with 300 g of a vinyl methyl ether/maleic anhydride copolymer (1:1 mol ratio; mean molecular weight of 750,000), 600 g of water, and 30 g of lactic acid to form a mixture of pH 3. By shaping the mixture as in Example 2, a lip stick shaped adhesive was obtained.

EXAMPLE 7

Following the same procedure as in Example 1, 100 g of ammonium N-lauroyl-L-aspartate as the gelling agent was mixed with 250 g of a vinyl methyl ether/maleic anhydride copolymer (1:1 mol ratio; mean molecular weight of 250,000), 499 g of water, 150 g of ethylene glycol monophenyl ether, and 1 g of a water soluble dye (Acid Red). The pH of the mixture obtained was 2.8. By shaping the mixture as in Example 2, a stick shaped adhesive was obtained.

EXAMPLE 8

Following the same procedure as in Example 1, 100 g of disodium N-stearoyl-L-aspartate as the gelling agent was mixed with 300 g of a vinyl methyl ether/maleic anhydride copolymer (1:1 mol ratio; mean molecular weight of 250,000), 540 g of water, 50 g of ethylene glycol monobutyl ether, and 10 g of tartaric acid. The pH of the mixture was 4.0. By shaping the mixture as in Example 2, a stick shaped adhesive was obtained.

Each of the stick shaped adhesives obtained in Examples 2 to 8 had excellent shape stability without undergoing deformation on use and could also be easily applied to adherend surfaces. Also, when kraft papers, art papers, and cardboard were bonded to each other using each adhesive stick and a bonding test performed, the papers were torn in each case, which confirmed that the adhesives had sufficient adhesive property for papers.

Furthermore, each of the adhesives contained in respective closed containers was stored for 6 months at room temperature and then the properties thereof tested. The results showed that the coating property and the adhesive property were the same as those directly after preparation as well as that the volatilization loss of the adhesive was less than 0.5% by weight of the total weight thereof.

EXAMPLE 9

Into a three-necked flask were charged 480 g of water, 40 g of cyclohexanone, 320 g of a vinyl methyl ether/maleic anhydride copolymer (1:1 mol ratio; mean molecular weight of 250,000), and 160 g of monosodium N-stearoyl-L-glutamate and the mixture was stirred for about 2 hours at about 90° C to dissolve the components. The mixture was then poured into a stainless steel split mold of 15 mm diameter and 30 mm length while hot and then allowed to cool in a refrigerator of −5° C whereby the mixture gelled. The stick shaped adhesive was then placed in a lip stick type container. When the adhesive stick was applied to a kraft paper, it spread thereover smoothly without cobwebbing. Kraft papers were then bonded to each other directly thereafter. When the assembly was pressed by a finger and peeled after 2 minutes, the papers were torn with fluffing, which showed sufficient adhesive property.

EXAMPLE 10

Into a 500 kiloliter stainless steel vessel equipped with a stirrer, a reflux condenser, and a steam heating jacket were charged 220 kg of water, 60 kg of secondary butanol, 150 kg of a vinyl methyl ether/maleic anhydride copolymer (1:1 mol ratio, mean molecular weight of 250,000), and 70 kg of monosodium N-stearoyl-L-glutamate and the mixture was stirred for 4 hours at about 90° C to dissolve the components. Then, the mixed solution thus obtained was continuously filled into lip stick type containers by means of an automatic packing machine and then gelled by cooling. The product had a comparatively low viscosity and showed fluidity at high temperatures and thus could easily be filled into the containers. The stick shaped adhesives thus prepared were stored for 3 months at room temperature and the properties thereof then tested. The results showed that the weight loss was less than 0.5% by weight and the coating properties and adhesive properties were almost same as those directly after preparation.

While the invention has been described in detail and with reference to specific embodiments thereof, it will be apparent to one skilled in the art that various changes and modifications can be made therein without departing from the spirit and scope thereof.

What is claimed is:

1. An adhesive composition comprising:
   (a) a water soluble or water dispersible polymer having adhesive properties present in an amount of about 5 to 50% by weight of the total weight of the adhesive composition;
   (b) an N-fatty acid acylated amino acid or a salt thereof present in an amount of about 2 to about 30% by weight of the total amount of the adhesive composition; and
   (c) water or a mixture of water and one or more organic solvent(s) and/or one or more plasticizer(s), wherein the proportion of said water or said mixture of water and one or more organic solvent(s) and/or one or more plasticizer(s) contained in the adhesive composition is about 30 to 80% by weight of the total adhesive composition, but the proportion of the one or more organic solvent(s) and/or one or more plasticizer(s) is less than the amount of water together therewith.

2. The adhesive composition as claimed in claim 1, wherein said N-fatty acid acylated amino acid is an N-alkanoyl amino acid, said alkanoyl group having 7 to 23 carbon atoms, an N-alkenoyl amino acid, said alkenoyl group having 7 to 23 carbon atoms, or a mixture of such acids.

3. The adhesive composition as claimed in claim 1, wherein the amino acid moiety of the N-fatty acid acylated amino acid has from 2 to 10 carbon aotms.

4. The adhesive composition as claimed in claim 1, wherein the amino acid of said N-fatty acid acylated amino acid is a neutral aliphatic amino acid or an acid aliphatic amino acid.

5. The adhesive composition as claimed in claim 1, wherein said N-fatty acid acylated amino acid consists essentially of an N-alkanoyl amino acid, said alkanoyl group having 7 to 23 carbon atoms.

6. The adhesive composition as claimed in claim 1, wherein said water soluble or water dispersible polymer having adhesive properties is a carboxyl group and/or a carboxylic anhydride group containing polymer.

7. The adhesive composition as claimed in claim 6, wherein the proportion of the carboxyl and/or carboxylic anhydride group containing monomer present in any water soluble or water dispersible polymer is from about 10 to about 100 mol%, based on the total mols of monomer(s) used.

8. The adhesive composition as claimed in claim 1, wherein said water soluble or water dispersible polymer having adhesive properties is a cellulose derivative.

9. The adhesive composition as claimed in claim 1, wherein said water soluble or water dispersible polymer having adhesive properties is a starch derivative.

10. The adhesive composition as claimed in claim 1, wherein the salt of said N-fatty acid acylated amino acid is an alkali metal salt, an ammonium salt or an amine salt thereof.

11. The adhesive composition as claimed in claim 1, wherein said organic solvent is isobutanol, ethylene glycol, glycerol, hexylene glycol, mono-, di-, or tri-ethylene glycol mono-butyl ether, mono-, di-, or tri-ethylene glycol di-butyl ether, mono-, di-, or tri-ethylene glycol mono-ethyl ether, mono-, di-, or tri-ethylene glycol di-ethyl ether, mono-, di-, or tri-ethylene glycol mono-methyl ether, mono-, di-, or tri-ethylene glycol di-methyl ether, mono-, di-, or tri-ethylene glycol monophenyl ether, mono-, di-, or tri-ethylene glycol di-phenyl ether, acetyl trialkyl citrate, said alkyl having 1 to 8 carbon atoms, mono-, di-, or tri-ethylene glycol mono-butyl ehter acetate, glycerol triacetate, a condensation product of adipic acid and ethylene glycol, or cyclohexanone.

12. The adhesive composition as claimed in claim 1, wherein the proportion of said N-fatty acid acylated amino acid or the salt thereof contained in the adhesive composition is about 4 to 20% by weight.

13. The adhesive composition as claimed in claim 12, wherein the proportion of said water soluble or water dispersible polymer having adhesive properties contained in the adhesive composition is about 15 to 35% by weight.

14. The adhesive composition as claimed in claim 13, wherein the proportion of said water or said mixture of water and one or more organic solvent(s) and/or one or more plasticizer(s) contained in the adhesive composition is about 40 to about 70% by weight.

15. The adhesive composition as claimed in claim 1, wherein an organic solvent is used together with water as the component (c).

16. The adhesive composition as claimed in claim 1, wherein a plasticizer is used together with water as the component (c).

17. The adhesive composition as claimed in claim 1, wherein said water soluble or water dispersible polymer is a member selected from the calss consisting of a copolymer of vinyl methyl ether and maleic anhydride, a copolymer of isobutylene and maleic anhydride, polyacrylic acid, polymethacrylic acid, a copolymer of styrene and acrylic acid, or a copolymer of ethylene and acrylic acids.

18. The adhesive composition as claimed in claim 17, wherein the proportion of the carboxyl and/or carboxylic anhydride group containing monomer present in any water soluble or water dispersible polymer is from about 10 to about 100 mol%, based on the total mols of monomer(s) used.

19. The adhesive composition as claimed in claim 2, wherein the N-fatty acid acylated amino acid is N-myristoylaspartic acid, N-palmitoylaspartic acid, N-stearoylaspartic acid, N-myristoylglutamic acid, N-palmitoylglutamic acid or N-stearoylglutamic acid.

20. The adhesive composition as claimed in claim 1, wherein said water soluble or water dispersible polymer having adhesive properties is a member selected from the group consisting of a vinyl pyrrolidone/vinyl acetate copolymer, polyvinyl acetate, polyvinyl methyl ether, polyvinyl pyrrolidone and polyvinyl alcohol.

21. The adhesive composition as claimed in claim 1, wherein said water soluble or water dispersible polymer having adhesive properties is starch or dextrin.

* * * * *